United States Patent Office 2,838,734
Patented June 10, 1958

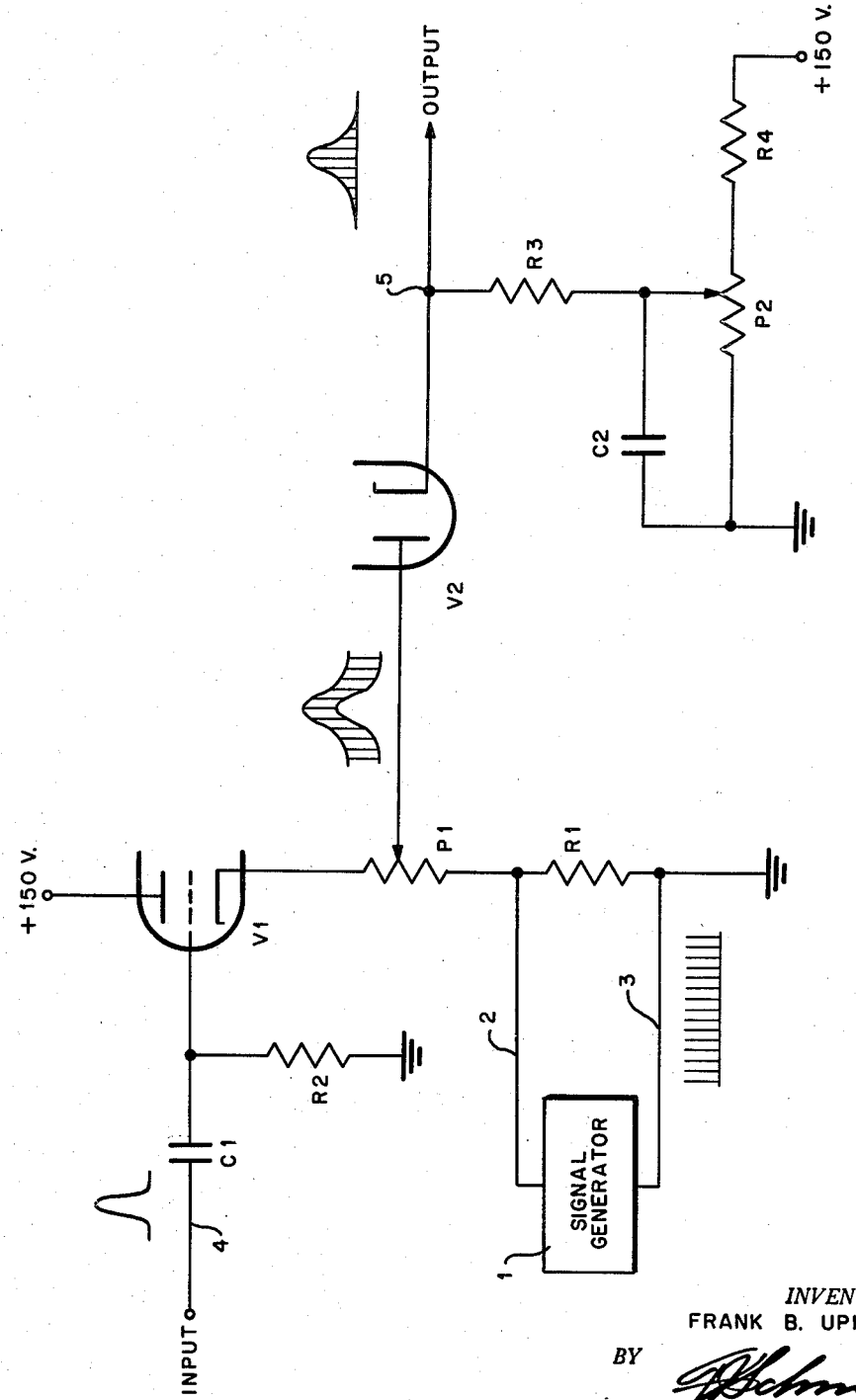

2,838,734

MODULATION CIRCUIT

Frank B. Uphoff, Churchville, Pa., assignor to the United States of America as represented by the Secretary of the Navy Application April 27, 1955, Serial No. 504,387

2 Claims. (Cl. 332—9)

(Granted under Title 35, U. S. Code (1952), sec. 266)

The invention described herein may be manufactured and used by or for the Government of the United States of America for governmental purposes without the payment of any royalties thereon or therefor.

The present invention relates to an amplitude modulator and more particularly to a modulator system in which spaced pulsed signals are mixed with the output of a pulse generator to produce modulated pulses.

Although modulation of pulsed signals has heretofore been possible, no systems are known for performing the exact function of this invention.

The modulator of this invention may be used to produce signals which are useful in radar simulator systems. For example, in testing and developing radar equipment it is advantageous to be able to modulate pulses in the same way that they are normally modulated by the action of the antenna beam pattern as it scans an actual target. The ability to produce such signals without setting up complex transmitter equipment and targets has the advantages of flexibility, economy, and feasibility to reproduce almost any type of target condition that may occur in service.

Briefly, the invention comprises a triode in which pulses are supplied to the grid and a signal is supplied from a signal generator across a resistor in the cathode circuit of said triode. The circuit parameters are so adjusted that the triode does not conduct unless the pulses are supplied to the grid. The output of the triode is then fed to the anode of a rectifier tube which is biased on the cathode by a positive voltage to such a degree that the rectifier tube will barely not conduct when no signal is supplied to the grid of the triode. Therefore, when the pulses are supplied to the triode grid the rectifier tube will conduct and the result will be a series of pulses equivalent to the input pulses to the triode grid which, however, are modulated.

An object of the present invention is the provision of a modulation system in which the output from a signal generator is modulated by a series of wave forms, said output being passed only in the presence of the wave forms.

Another object is to provide a modulation system in which the signal from a low impedance signal source and a wave form from a relatviely high impedance source, each source individually grounded, are placed in series in such a manner as to add their instantaneous voltage amplitudes.

A further object of the invention is the provision of modulation apparatus for producing pulses which are suitable for use in testing radar equipment.

Other objects and advantages of the invention will hereinafter become more fully apparent from the following description of the annexed drawing, which illustrates a preferred embodiment.

The figure illustrates the basic circuit of the invention and includes a signal generator 1 which feeds a signal of the type graphically illustrated by leads 2 and 3 across resistor $R_1$. The resistor $R_1$ is part of the cathode circuit of triode $V_1$. Simultaneously with this, a modulating wave of the form illustrated is supplied to the grid of triode $V_1$ by circuit line 4 through coupling capacitor $C_1$, the signal being developed across grid resistor $R_2$. The output load resistance of tube $V_1$ comprises the resistance portion of potentiometer $P_1$ and resistor $R_1$ in series.

The rectifier tube $V_2$ is provided with its anode connected to the contact arm of potentiometer $P_1$ and its cathode connected at junction 5 to both the output and resistance $R_3$. The contact arm of potentiometer $P_1$ determines the amplitude of the total signals being fed to the tube $V_2$. $R_1$, the terminating resistor of the output from the signal generator 1, and the resistance portion of potentiometer $P_1$ to the contact arm effectively place the two signal sources in series so that an additive wave form results as illustrated directly above the contact arm of potentiometer $P_1$.

A positive voltage is applied to the cathode of rectifier $V_2$ so that $V_2$ does not conduct in the absence of a modulating wave form at the input to coupling capacitor $C_1$. Potentiometer $P_2$ forms the adjustable resistance between ground and a positive 150 volt supply to provide proper voltage on the cathode of $V_2$ for this function. A by-pass capacitor $C_2$ places the voltage at the contact arm of potentiometer $P_2$ at A. C. ground. The dropping resistor $R_4$ insures the proper voltage range across potentiometer $P_2$. As indicated previously, detector $V_2$ will not conduct in the presence of a signal from generator 1 unless a modulating wave form is present, the bias voltage on the cathode being adjusted by potentiometer $P_2$ for exactly this operating point. The output voltage is developed across resistor $R_3$, the wave form appearing at the cathode of detector $V_2$ as graphically illustrated.

It will be noted that one advantage of the instant system is that it enables the taking of a signal from a low impedance signal source and a wave form from a relatively high impedance source and placing these two signals in series in such a manner as to add their instantaneous voltage amplitudes. A further advantage is that this system presents an apparatus capable of modulating one wave form with another wave form, both of which wave forms are derived from separate voltage sources. Therefore, the fact that both voltage sources may have individual ground connections would not interfere with the modulation as brought about in the present system.

Many alternative variations will be readily appreciated by one skilled in the art. For example, various types of tubes may be substituted and various types of variable resistances and other elements may be supplied. The bias on the rectifier may be impressed from sources of other than the type shown. Therefore, it is understood that the foregoing disclosure relates to only a preferred embodiment of the invention and that numerous modifications or alterations may be made therein without departing from the spirit or the scope of the invention as set forth in the appended claims.

What is claimed is:

1. Apparatus for generating amplitude modulated pulsed signals comprising a low impedance signal generator having a terminating resistor, a high impedance source for a modulating wave form, a unidirectional electronic flow device having a control grid and a cathode, means to couple the modulating wave form source to the unidirectional flow device control grid, a resistor to develop input modulating voltage disposed between said control grid and ground, a first potentiometer having a contact arm and a resistance element, the resistance element being tied to the cathode at one end and to the terminating resistor at its other end, the terminating resistor having the end opposite the potentiometer connected end tied to ground, a detector having an anode and a cathode, the anode being electrically connected to the contact arm, a bleeder comprising a second potentiometer having a contact arm and a resistance portion, a voltage dropping resistor in series with the resistance portion of the second potentiometer and connected to a voltage source, the end of the second potentiometer opposite the dropping resistor being tied to ground, a capacitor disposed between ground and the second potentiometer contact arm to provide A. C. ground at that point, the detector cathode being electrically connected to the second potentiometer contact arm, and modulated pulsed outputs being taken at the detector cathode.

2. Apparatus for generating amplitude modulated pulse signals comprising a low impedance signal generator having a terminating resistor, a high impedance source for a modulating wave form, a unidirectional electronic flow device having a control grid and a cathode, means to couple said modulating wave form source to said control grid, resistance means between said cathode and said terminating resistor, wiper contact means on said resistance means, detector means having an anode and cathode, the latter delivering the output of said apparatus, said anode electrically connected to said contact means and said detector cathode connected to a positive source of biasing voltage.

References Cited in the file of this patent

FOREIGN PATENTS 1,075,411    France _____ Apr. 14, 1954